(12) United States Patent
Williamson et al.

(10) Patent No.: US 7,378,829 B2
(45) Date of Patent: May 27, 2008

(54) METHOD AND SYSTEM FOR PROVIDING VOLTAGE

(75) Inventors: Matthew R. Williamson, Austin, TX (US); Marcus W. May, Austin, TX (US)

(73) Assignee: SigmaTel, Inc., Austin, TX (US)

( * ) Notice: Subject to any disclaimer, the term of this patent is extended or adjusted under 35 U.S.C. 154(b) by 360 days.

(21) Appl. No.: 11/166,871

(22) Filed: Jun. 24, 2005

(65) Prior Publication Data

US 2006/0291257 A1 Dec. 28, 2006

(51) Int. Cl.
*G05F 1/56* (2006.01)
(52) U.S. Cl. ...................................... 323/349
(58) Field of Classification Search ................ 323/282, 323/283, 284, 285, 349, 351
See application file for complete search history.

(56) References Cited

U.S. PATENT DOCUMENTS 5,548,206 A * 8/1996 Soo ............................ 323/284
6,984,967 B2 * 1/2006 Notman ...................... 323/282

* cited by examiner

*Primary Examiner*—Adolf Berhane
(74) *Attorney, Agent, or Firm*—Toler Law Group

(57) ABSTRACT

A system and method to provide voltage to a device from the operating mode of an integrated circuit is disclosed. In a particular embodiment, the disclosed system includes an integrated circuit having an input/output pin and a DC-DC converter circuit that is coupled to the input/output pin and including a transistor element. The DC-DC converter circuit has a first mode of operation and a second mode of operation. In the first mode of operation, the DC-DC converter circuit performs voltage conversion and in the second mode of operation, the transistor element of the DC-DC converter circuit is used to selectively apply a voltage supply to an external module coupled to the input/output pin.

18 Claims, 5 Drawing Sheets

METHOD AND SYSTEM FOR PROVIDING VOLTAGE

FIELD OF THE DISCLOSURE

The present disclosure relates to methods and systems for providing voltage to a device from an integrated circuit.

BACKGROUND

In many integrated circuit applications, it is advantageous for the integrated circuit to provide voltage to modules external to the integrated circuit. It is often useful to control the voltage provided by the integrated circuit to the external modules to be switched on and off. This can allow the integrated circuit to selectively shut down the external module, and to provide voltage to the external module during a reset condition. Voltage control is sometimes provided by using an external switch, such as a transistor element coupled to an input of the external module that is controlled by the integrated circuit. However, the external switch, such as the transistor element, adds expense to the system.

In many applications, including applications involving portable devices, voltage is provided to the integrated circuit by a battery that is external to the integrated circuit. The voltage provided by the battery is often modified by the integrated circuit to provide a designated voltage to the external module. Since different portable devices use different battery types and configurations having different input voltage levels, it would be desirable for the integrated circuit to adapt to a variety of battery types.

Accordingly, there is a need for an improved system and method to provide voltage to modules external to an integrated circuit.

DESCRIPTION OF THE DRAWING(S)

A system and method to provide voltage to a device from the operating mode of an integrated circuit is disclosed. In a particular embodiment, the disclosed system includes an integrated circuit having an input/output pin and a DC-DC converter circuit that is coupled to the input/output pin and including a transistor element. The DC-DC converter circuit has a first mode of operation and a second mode of operation. In the first mode of operation, the DC-DC converter circuit performs voltage conversion and in the second mode of operation, the transistor element of the DC-DC converter circuit is used to selectively apply a voltage supply to an external module coupled to the input/output pin.

In a particular embodiment, the method includes determining a battery configuration of an integrated circuit and selectively setting a mode of operation of a DC-DC converter circuit that is embedded within the integrated circuit to a first mode or a second mode of operation. During the first mode of operation, the DC-DC converter circuit performs voltage conversion. During the second mode of operation a transistor element of the DC-DC converter circuit is used to selectively control application of a voltage supply to an external device.

Figure 1:
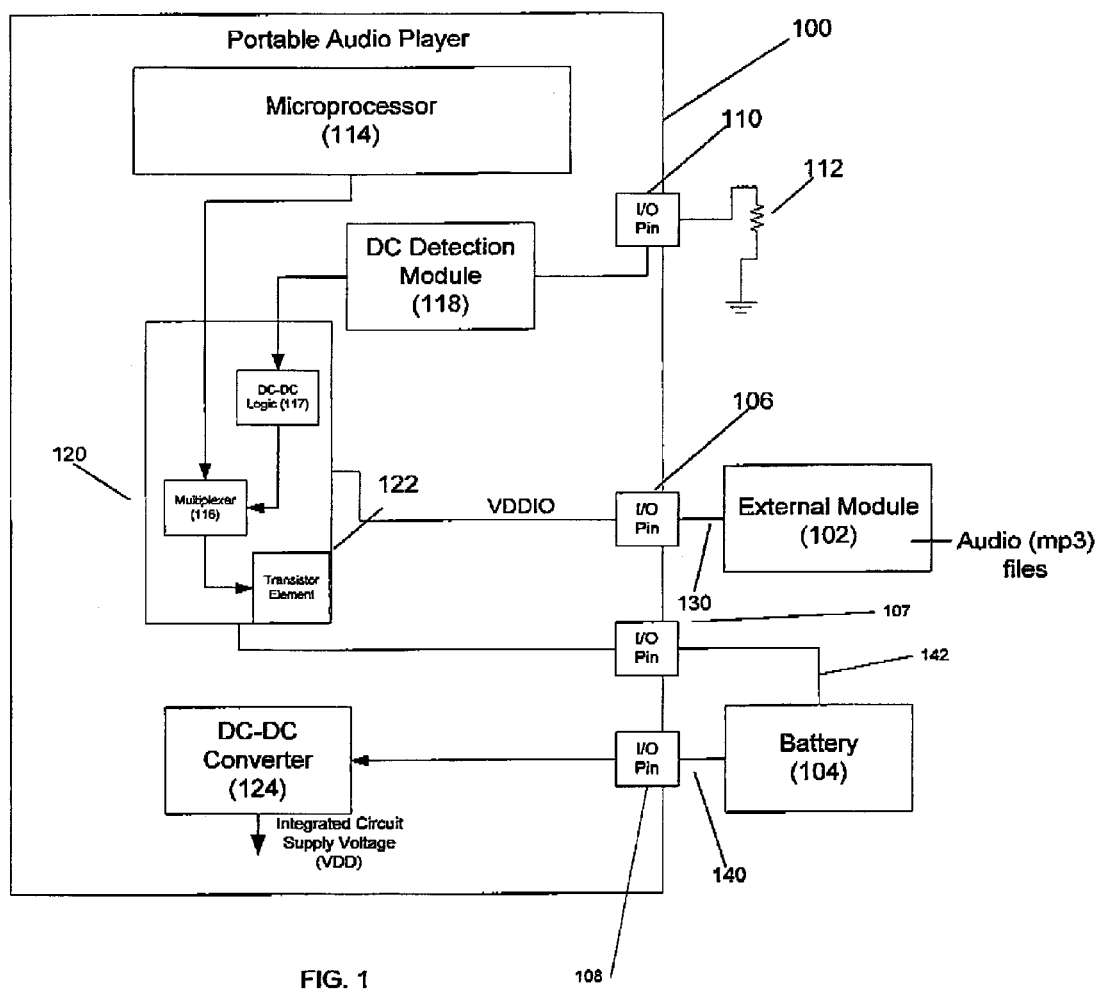
FIG. 1 is a block diagram of an integrated circuit incorporating direct current to direct current (DC-DC) converter circuits to provide voltage conversion.

Referring to FIG. 1, an integrated circuit 100 is illustrated. The integrated circuit 100 is coupled to an external module 102. In a particular embodiment, the external module 102 is a peripheral module that may be another integrated circuit. In a particular embodiment, the integrated circuit 100 is directly coupled to the external module 102 without use of an intervening transistor element. In a particular embodiment, the external module 102 is a peripheral component, such as an audio storage component capable of storing digital audio files. In a particular embodiment, both the integrated circuit 100 and the external module 102 are incorporated into a portable audio player, such as an MP3 player.

The integrated circuit 100 includes a first input/output (I/O) pin 106 that may provide a voltage supply, a second I/O pin 107 that may receive a battery input, a third I/O pin 108 that may also receive a battery input, and a fourth I/O pin 110 that may be used for battery mode detection. The fourth I/O pin 110 is coupled to an external resistor 112 that is further coupled to ground. The fourth I/O pin 110 is coupled to an input of a DC detection module 118. An output of the DC detection module 118 is coupled to an input of a first DC-DC converter circuit 120.

The first DC-DC converter circuit 120 includes a multiplexer 116, a DC-DC logic module 117, and a transistor element 122. The DC-DC logic module is coupled to the DC Detection module 118. An output of the DC-DC logic module is coupled to the multiplexer 116. The multiplexer 116 is also coupled to an output of a microprocessor 114. An output of the multiplexer 116 is coupled to the transistor element 122.

An output of the first DC-DC converter circuit 120 is coupled to the first I/O pin 106. The first I/O pin 106 can be used to provide a voltage supply 130 to the external module 102. An input of the first DC-DC converter circuit 120 is coupled to the second I/O pin 107 to receive a voltage input 142 from the external battery 104. The integrated circuit 100 also includes a second DC-DC converter 124. An input of the second DC-DC converter 124 is coupled to the third I/O pin 108 to receive a voltage input 140 from the external battery 104.

The battery 104 provides voltage to the integrated circuit 100 at the second I/O pin 107 and the third I/O pin 108. The battery 104 may be any battery or a collection of batteries, including lithium ion, alkaline, or series AA type batteries. The integrated circuit 100 uses one or more DC-DC converters to regulate a source voltage to an appropriate level for internal modules and to provide a desired voltage to the external module 102 through the first I/O pin 106.

The value of the resistor 112 coupled to the fourth I/O pin 110 may be selected to identify the type of the battery 104. In a particular embodiment, the value of the resistor 112 may be set to float, to 270 kilo-ohms, to 120 kilo-ohms or to ground, to identify four different possible types of the battery 104.

The DC detection module 118 senses the value of the resistor 112. Based on the sensed resistor value, the DC detection module 118 determines a battery mode for the integrated circuit 100.

The microprocessor 114 controls different portions of the integrated circuit 100, and can incorporate software to control specific functions of the integrated circuit 100. The software can control application of a voltage signal or other control signals that are selectively sent to the external module 102. The microprocessor 114 and the DC logic module 117 send control signals to the multiplexer 116. The control signals sent by the DC logic module 117 can be based on the battery mode detected by the DC detection module 118. Based on the received control signals, the multiplexer 116 sends control signals to the transistor element 122 to control the mode of operation for the first DC-DC converter circuit 120.

In a first mode of operation, as illustrated in FIG. 1, the first DC-DC converter circuit 120 performs voltage conversion to regulate the voltage provided by the battery 104. In the first mode of operation, the transistor element 122 is used as a component of the first DC-DC converter circuit 120 to perform this voltage conversion. Depending on the detected battery type and the corresponding configuration as indicated by the control signals received from the multiplexer 116, the first DC-DC converter circuit 120 may be used to enhance the voltage provided by the battery 104 (boost mode) or may be used to attenuate the voltage provided by the battery 104 (buck mode).

Figure 2:
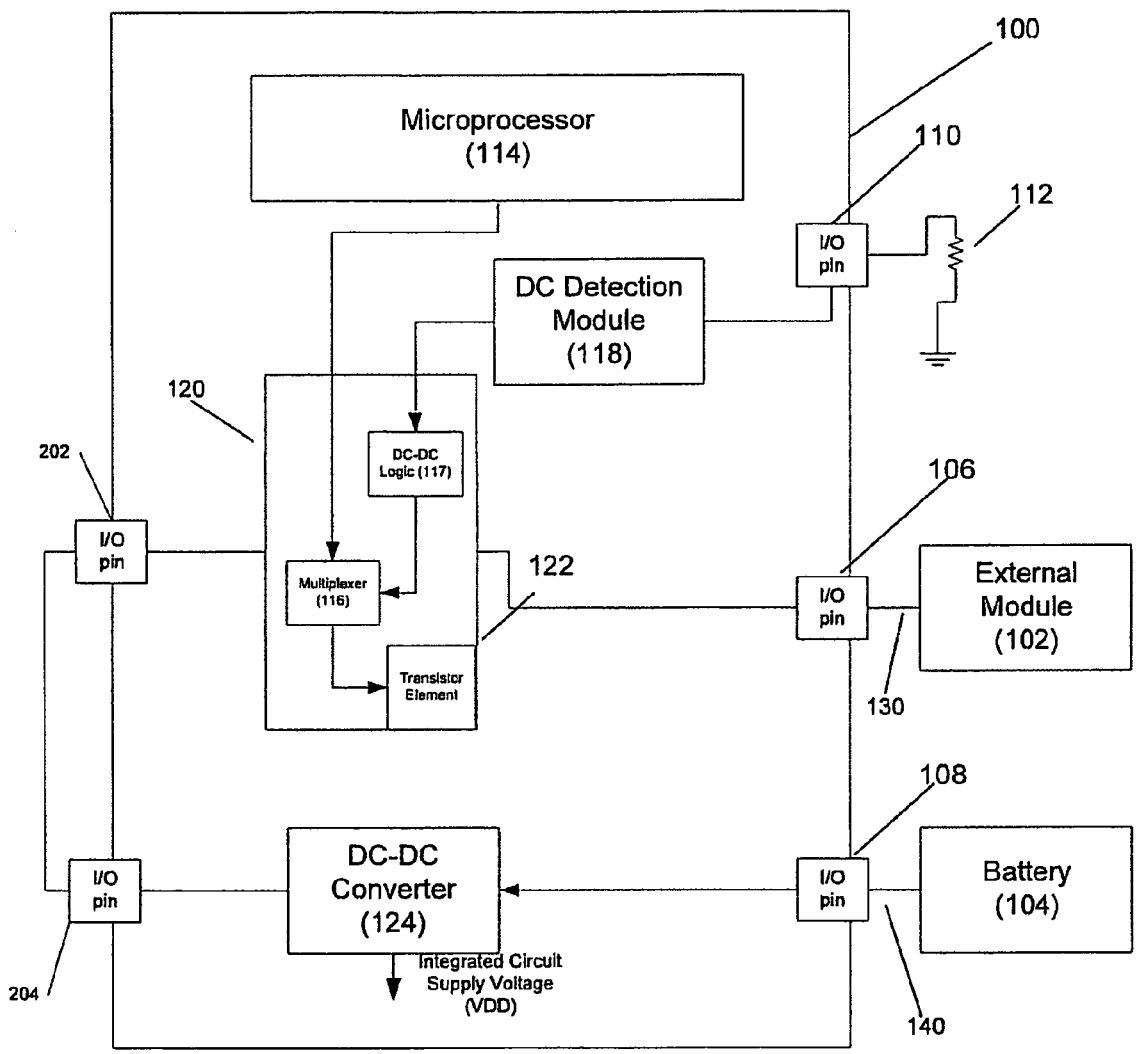
FIG. 2 is a block diagram of an integrated circuit incorporating direct current to direct current (DC-DC) converter circuits to provide voltage to an external module.

Referring to FIG. 2, the integrated circuit 100 is illustrated in a second mode of operation. The integrated circuit 100 includes a fifth I/O pin 202 and a sixth I/O pin 204. The first DC-DC converter circuit 122 is coupled to the second DC-DC converter circuit via the fifth I/O pin 202 and the sixth I/O pin 204.

In the second mode of operation, the first DC-DC converter circuit 120 is inactive for voltage conversion and the transistor element 122 of the first DC-DC converter circuit is used to selectively apply a voltage supply to the external module 102 via the first I/O pin 106. In the second mode of operation, the transistor element 122 can be controlled by a software control function stored in the microprocessor 114. For example, the transistor element 122 can be switched on or off based on control signals from the microprocessor 114 sent via the multiplexer 116. In a particular embodiment, the voltage supply to be applied externally is received from the second DC-DC converter circuit 124 via the fifth I/O pin 202 and the sixth I/O pin 204. When the external module 102 receives the initial application of the voltage supply, the external module 102 can detect a power on reset (POR) condition in response. In a particular embodiment, the first DC-DC converter circuit 120 selectively applies the voltage supply 130 at a desired voltage level to the external module 102 in response to the DC detection module 118 detecting that the battery 104 is of a type that does not require voltage conversion by the first DC-DC converter circuit 120. For example, the first DC-DC converter circuit 120 may not be needed for voltage conversion when the battery 104 is an alkaline battery. The first DC-DC converter circuit 120 is then placed in a mode of operation to selectively apply the voltage supply 130 received from the second DC-DC converter 124 to the external module 102.

The second DC-DC converter circuit 124 converts the voltage received at the second I/O pin 108 to an integrated circuit supply voltage (VDD). This supply voltage may be used to provide voltage to internal components of the integrated circuit 100, including the microprocessor 114 and the DC detection module 118. The second DC-DC converter circuit 124 also converts the voltage received at the second I/O pin 108 to an external supply voltage (VDDIO). This external supply voltage is selectively applied to the external module 102 via that first DC-DC converter circuit 120.

Figure 3:
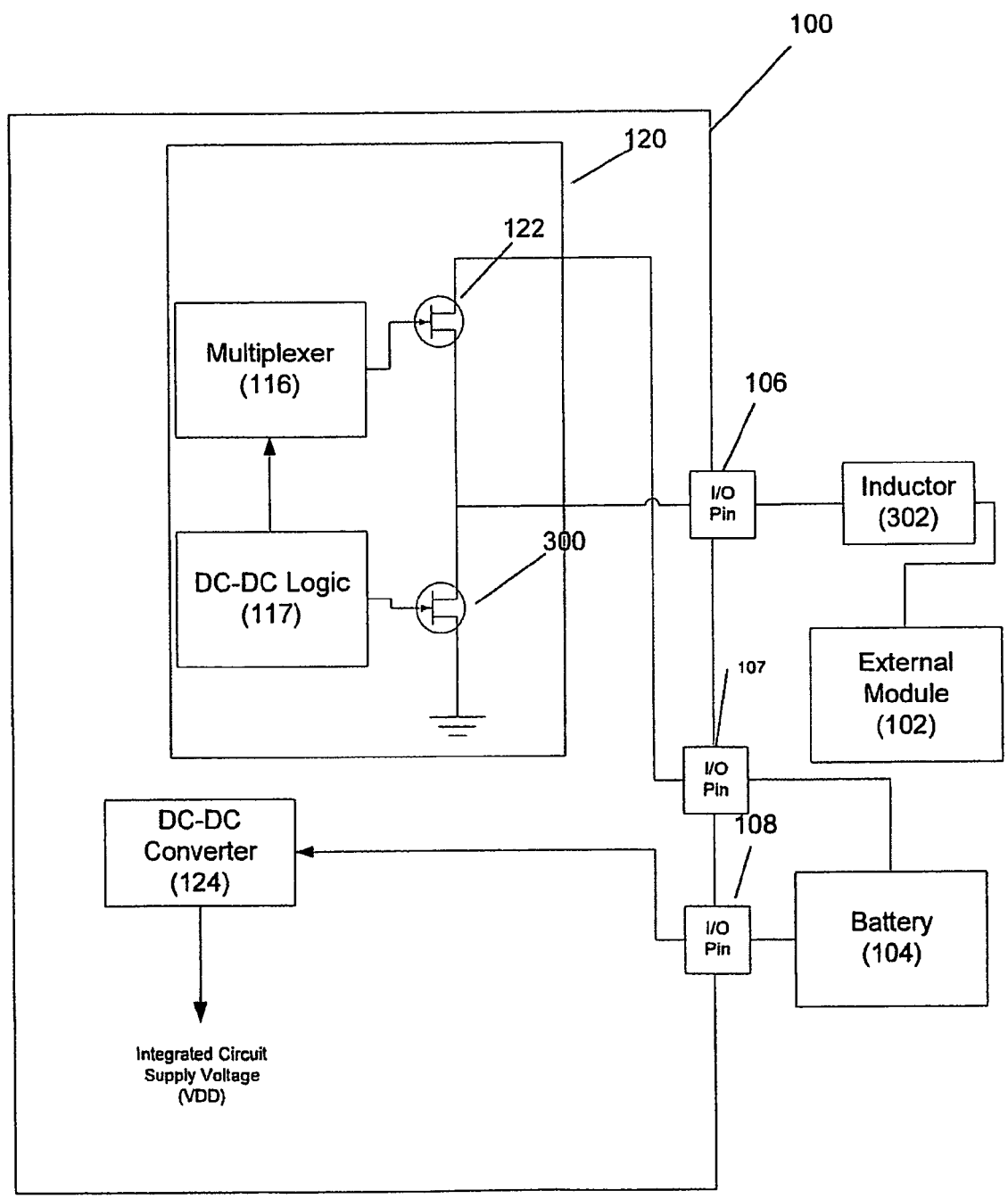
FIG. 3 is a diagram of a portion of the integrated circuit of FIG. 1 that illustrates a DC-DC converter circuit in a first mode of operation to provide voltage conversion.

Referring to FIG. 3, a particular embodiment of a portion of the integrated circuit 100 where the first DC-DC converter circuit 120 is in a first mode of operation to perform voltage conversion is shown. The DC-DC converter circuit 120 includes the transistor element 122 coupled to the transistor element 300. The transistor element 122 is further coupled to the first I/O pin 106 and the second 110 pin 107. The transistor element 300 is coupled to the first I/O pin 106 and ground. The transistor element 300 is controlled by the DC-DC logic module 117. In the first mode of operation, first I/O pin 106 is coupled to an inductor 302. The inductor 302 is coupled to the external module 102.

The control signals provided by the multiplexer 116 and by the DC-DC logic module 117 place the first DC-DC converter circuit 120 in a proper state for voltage conversion. The voltage provided by the battery 104 is converted by the second DC-DC converter circuit 124, and is provided to the external module 102 via the inductor 302.

Figure 4:
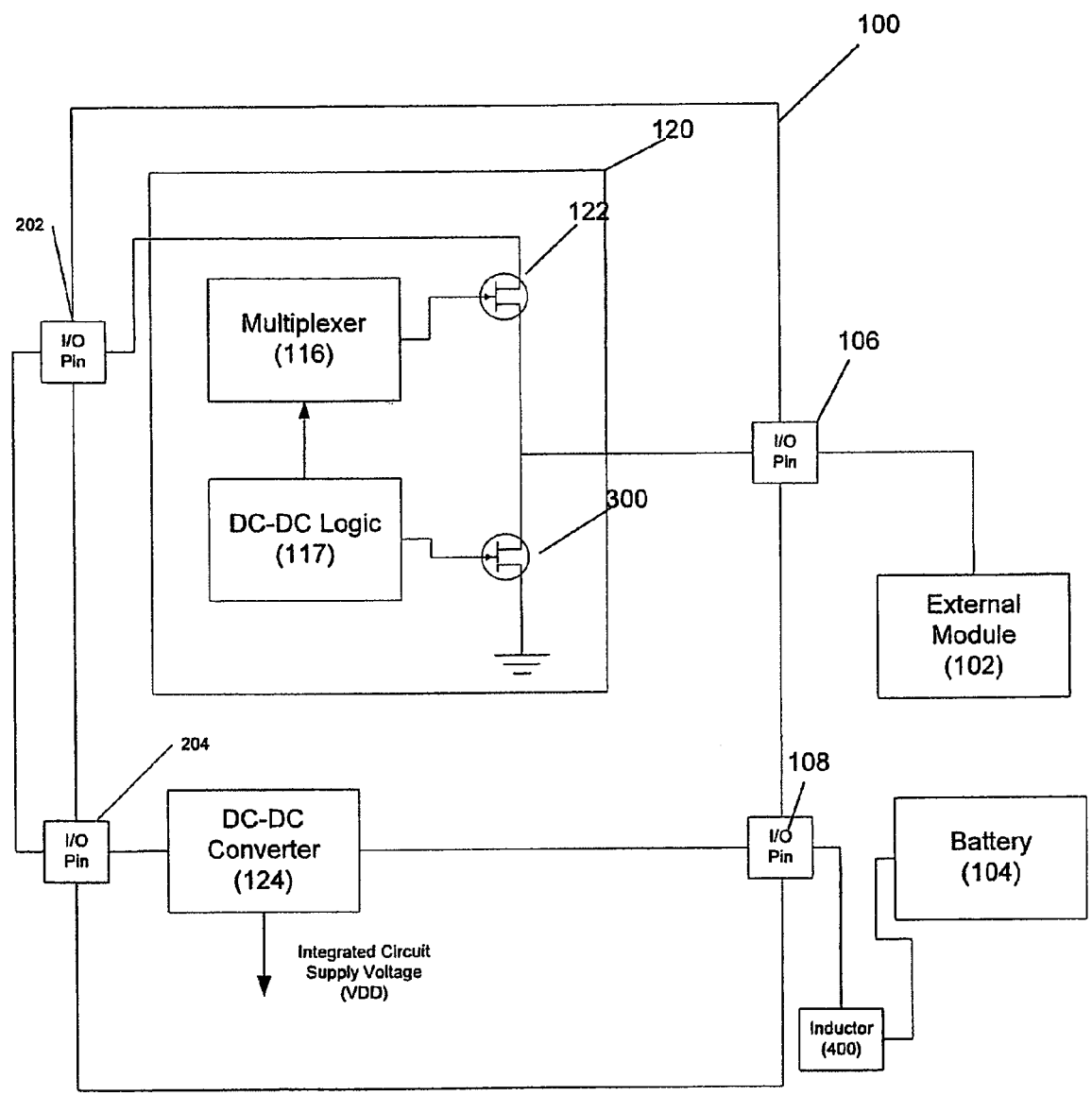
FIG. 4 is a diagram of a portion of the integrated circuit of FIG. 2 that illustrates a DC-DC converter circuit in a second mode of operation to provide an external voltage supply.

Referring to FIG. 4, a particular embodiment of a portion of the integrated circuit 100 where the first DC-DC converter circuit 120 is in a second mode of operation to apply a voltage supply is illustrated. The third I/O pin 108 is coupled to an inductor 400 that is coupled to battery 104. In this second mode of operation, the transistor element 122 of the first DC-DC converter circuit 120 is controlled by a control signal provided by the multiplexer 116. The control signal can be used to selectively control the switching of the transistor element 122 to apply a voltage supply received from the second DC-DC converter circuit 124 to the external module 102 through the first I/O pin 106. The transistor element 122 can be under software control and can provide a power on reset signal to the external module 102.

Figure 5:
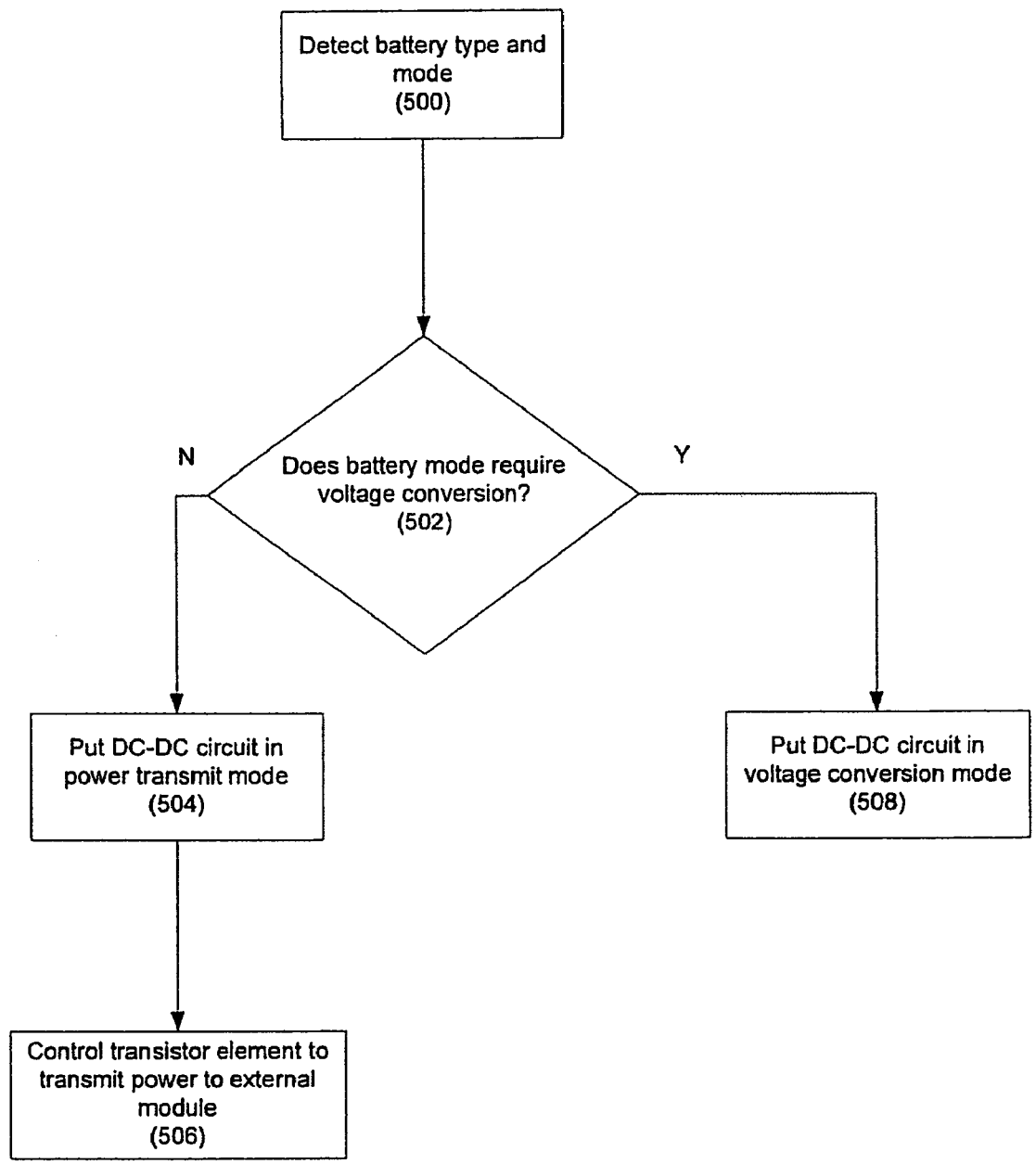
FIG. 5 is a flowchart of a particular embodiment of a method of determining a mode of operation for a DC-DC converter circuit.

Referring to FIG. 5, a method of determining a mode of operation of a DC-DC converter circuit is illustrated. At step 500, the battery type and a corresponding mode of operation is determined. At step 502, it is determined if the battery mode requires conversion of a received voltage by the DC-DC converter circuit. If the battery mode requires voltage conversion, the DC-DC converter circuit is placed into a voltage conversion mode at step 508.

If at step 502 it is determined that the battery mode does not require voltage conversion by the DC-DC converter circuit, the DC-DC converter circuit is placed in a voltage transmit mode at step 504 and a transistor element of the DC-DC converter circuit may be controlled by software to selectively apply a voltage supply to an external module as shown, at step 506.

Thus, with the disclosed system and method, a transistor element within a DC-DC converter is used in certain modes of operation to selectively control a voltage supply to an external device. The reuse of the transistor element provides cost savings by removing the need for an added external transistor.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An integrated circuit device comprising:
   an input/output pin;
   a first direct current to direct current converter circuit coupled to the input/output pin and including a transistor element,
   wherein the first direct current to direct current converter circuit has a first mode of operation and a second mode of operation, wherein in the first mode of operation the first direct current to direct current converter circuit performs voltage conversion and in the second mode of operation no voltage conversion is performed by the first direct current to direct current converter circuit and the transistor element is used to selectively apply a voltage supply from a second direct current to direct current converter circuit within the integrated circuit device to an external module coupled to the input/output pin.

2. The integrated circuit of claim 1, wherein the external module is a peripheral component.

3. The integrated circuit of claim 1, wherein in the second mode of operation, the transistor element is controlled by a software control function.

4. The integrated circuit of claim 1, wherein the external module detects a power on reset condition in response to receiving the voltage supply.

5. The integrated circuit of claim 1, wherein the mode of operation is controlled by a multiplexer.

6. The integrated circuit of claim 1, further comprising: an internal module to determine a battery configuration mode.

7. The integrated circuit of claim 6, wherein the internal module is operable to control the first direct current to direct current converter circuit mode of operation.

8. The integrated circuit of claim 1, wherein the first direct current to direct current converter circuit is incorporated in a portable audio device.

9. The integrated circuit of claim 8, wherein the external module is capable of storing audio files.

10. The integrated circuit of claim 9, wherein the external module is capable of storing MP3 files.

11. A method comprising:
    determining a battery configuration of an integrated circuit; and
    selectively setting a mode of operation of a first direct current to direct current converter circuit embedded within the integrated circuit to a first mode or a second mode of operation, wherein during the first mode of operation the first direct current to direct current converter circuit performs voltage conversion and during the second mode of operation no voltage conversion is performed by the first direct current to direct current converter circuit and a transistor element of the first direct current to direct current converter circuit is used to selectively control application of a voltage supply from a second direct current to direct current converter circuit within the integrated circuit to an external device.

12. The method of claim 11, further comprising:
    controlling the transistor element using a software control element within the integrated circuit device during the second mode of operation.

13. The method of claim 11, further comprising:
    initiating a power on reset condition at the external device in response to providing the voltage supply applied to the input/output pin.

14. A system comprising:
    a first integrated circuit comprising:
      an input/output pin;
      a first direct current to direct current converter circuit coupled to the input/output pin and including a transistor element,
      wherein the first direct current to direct current converter circuit has a first mode of operation and a second mode of operation, wherein in the first mode of operation the first direct current to direct current converter circuit performs voltage conversion and in the second mode of operation no voltage conversion is performed by the first direct current to direct current converter circuit and the transistor element of the first direct current to direct current converter circuit is used to selectively apply a voltage from a second direct current to direct current converter circuit within the first integrated circuit to the input/output pin; and
    a second integrated circuit having an input coupled to the input/output pin of the first integrated circuit.

15. The system of claim 14, wherein the second integrated circuit is a peripheral device that is coupled to the first integrated circuit without an intervening transistor element.

16. The system of claim 15, wherein the first and second integrated circuits are incorporated in a portable audio player.

17. The system of claim 16, wherein the second integrated circuit is capable of processing audio files.

18. The system of claim 17, wherein the second integrated circuit is capable of processing MP3 files.

* * * * *